United States Patent
Aussems et al.

(10) Patent No.: US 9,670,597 B2
(45) Date of Patent: Jun. 6, 2017

(54) CLOTHING COMPRISING A FABRIC, COMPRISING ELASTIC FIBERS

(71) Applicant: DSM IP ASSETS B. V., Heerlen (NL)

(72) Inventors: Hendricus Franciscus Aussems, Echt (CH); Martinus Joseph Maria Keulers, Echt (NL); Joanna Biernat, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/779,432

(22) PCT Filed: Mar. 20, 2014

(86) PCT No.: PCT/EP2014/055594
§ 371 (c)(1),
(2) Date: Sep. 23, 2015

(87) PCT Pub. No.: WO2014/154558
PCT Pub. Date: Oct. 2, 2014

(65) Prior Publication Data
US 2016/0047065 A1  Feb. 18, 2016

(30) Foreign Application Priority Data

Mar. 25, 2013 (EP) .................................. 13160825
May 31, 2013 (EP) .................................. 13170057

(51) Int. Cl.
| | |
|---|---|
| D01F 6/84 | (2006.01) |
| A41D 13/00 | (2006.01) |
| A41D 13/12 | (2006.01) |
| A41D 31/00 | (2006.01) |
| D03D 15/08 | (2006.01) |
| D04B 1/18 | (2006.01) |

(52) U.S. Cl.
CPC ............ D01F 6/84 (2013.01); A41D 13/0015 (2013.01); A41D 13/1236 (2013.01); A41D 31/00 (2013.01); D03D 15/08 (2013.01); D04B 1/18 (2013.01)

(58) Field of Classification Search
CPC ............ A41D 13/0015; A41D 13/1236; A41D 31/00; D01F 6/84; D03D 15/08; D04B 1/18
USPC .................................. 442/184, 306; 428/365
See application file for complete search history.

(56) References Cited

U.S. PATENT DOCUMENTS

| | | | | |
|---|---|---|---|---|
| 3,390,108 | A * | 6/1968 | Wilson | C08G 63/46 162/142 |
| 3,400,196 | A * | 9/1968 | Leroy | C08J 9/42 264/280 |
| 5,565,270 | A * | 10/1996 | Rehbold | C08G 18/0895 264/177.13 |
| 9,034,776 | B2 * | 5/2015 | Costantino | C08J 5/04 442/59 |
| 2003/0186610 | A1 | 10/2003 | Peters et al. | |
| 2010/0216905 | A1* | 8/2010 | Kuwamura | B29C 41/18 521/170 |

FOREIGN PATENT DOCUMENTS

| | | |
|---|---|---|
| EP | 0 019 575 | 11/1980 |
| EP | 0 081 369 | 6/1983 |
| GB | 1 035 999 | 7/1966 |

OTHER PUBLICATIONS

International Search Report for PCT/EP2014/055594 mailed Jun. 13, 2014, three pages.
"PRIPOL dimer acids and PRIPLAST dimer based polyester polyols for specialty industrial coating resins", UNIQEMA (2003).
Polymer Building Blocks, "EMPOL® Dimer & Trimer acids", COGNIS Corporation (2003).

* cited by examiner

*Primary Examiner* — Arti Singh-Pandey
(74) *Attorney, Agent, or Firm* — Nixon & Vanderhye P.C.

(57) ABSTRACT

Sports clothing, protective clothing, clothing for body shaping and clothing with a medical function, which clothing comprises at least one fabric comprising elastic fibers, which elastic fibers are produced from a polymer composition comprising a copolymer containing 20-80 wt. % of monomeric units of a dimerized fatty acid or a derivative thereof and further monomer units of at least one dicarboxylic acid and at least one diol.

6 Claims, No Drawings

CLOTHING COMPRISING A FABRIC, COMPRISING ELASTIC FIBERS

This application is the U.S. national phase of International Application No. PCT/EP2014/055594 filed 20 Mar. 2014 which designated the U.S. and claims priority to EP Patent Application No. 13160825.9 filed 25 Mar. 2013 and EP Application No. 13170057.7 filed 31 May 2013, the entire contents of each of which are hereby incorporated by reference.

The invention relates to sports clothing, protective clothing, clothing for body shaping and clothing with a medical function comprising at least one fabric, comprising elastic fibers.

Clothing comprising such fabrics is known, the fabrics being produced from for instance Spandex™ or Lycra™ fibers.

The fabrics of the elastic fibers serve in the clothing for example to provide comfort, to give support to the body, to give compression to body parts and to maintain the shape of the clothing. Examples of such clothing include underclothing, sports clothing, shape wear or even special supporting wear prescribed for medical reasons, for example supporting stockings.

If the clothing comprises more than one layer of fabric, the fabric comprising the elastic fibers is normally located at the inside of the clothing, so that in most cases it is touching the skin, or it is at least close to the skin of the wearer.

A problem with the clothing comprising at least one fabric, comprising the elastic fibers, is that the moisture released from the body of the person wearing the clothing, mostly in the form of transpiration, accumulates in the fabric. If the moisture is accumulated in the fabric the fabric gets wet and the moisture tends to cool down. In this way cold spots are formed in the fabric, which is highly unpleasant for the wearer, especially since the fabric is located at the skin or close to the skin. If the person wearing the clothing made a physical effort, after finishing this effort the clothing is still wet which has an unwanted cooling effect.

In US2003/0186610 clothing comprising a fabric comprising the elastic yarns, surrounded by hydrophobic yarns is disclosed. Because of the presence of the hydrophobic yarns the moisture is transported away from the skin of the wearer to outer layers of the clothing, where it can evaporate. A problem however is that still a hydrophilic elastic yarn is present in the fabric that absorbs moisture, so that still moisture accumulates in the fabric. Furthermore the structure of the yarn is complicated.

Object of the present invention is to provide sports clothing, protective clothing, clothing for body shaping and clothing with a medical function not showing this problem. Surprisingly this object is obtained if in the clothing comprises at least one fabric comprising elastic fibers, which elastic fibers are produced from a polymer composition comprising a copolymer containing 20-80 wt. % of monomeric units of a dimerised fatty acid or a derivative thereof and further monomer units of at least one dicarboxylic acid and at least one diol.

Because of the presence of the monomeric units of a dimerised fatty acid or a derivative thereof in the copolymer, the copolymer shows an elastomeric nature, so providing the fibers with elastic behavior.

Surprisingly in the fabric of the clothing of the invention less moisture accumulates, and at the same time the fabric shows excellent elastic properties. Furthermore the yarn used to produce the fabric might have a simple and straightforward structure.

The dimerised fatty acids may be obtained from monomeric unsaturated fatty acids by an oligomerisation reaction. The oligomer mixture is further processed, for example by distillation, to yield a mixture having a high content of the dimerised fatty acid. The double bonds in the dimerised fatty acid may be saturated by catalytic hydrogenation. The term dimerised fatty acid as it is used here relates to both types of these dimerised fatty acids, the saturated and the unsaturated. It is preferred that the dimerised fatty acids are saturated.

It is also possible that the copolymer of the polymer composition of the elastic fibers contains monomer units of derivatives of dimerised fatty acid. For example a dimerised fatty diol may be obtained as a derivative of the dimerised fatty acid by hydrogenation of the carboxylic acid groups of the dimerised fatty acid, or of an ester group made thereof. Further derivatives may be obtained by converting the carboxylic acid groups, or the ester groups made thereof, into an amide group, a nitril group, an amine group or an isocyanate group.

The dimerised fatty acids may contain from 32 up to 44 carbon atoms. Preferably the dimerised fatty acid contains 36 carbon atoms.

Further details relating to the structure and the properties of the dimerised fatty acids may be found in the corresponding leaflet "Pripol C36-Dimer acid" of the company UNICHEMA (Emmerich, Germany) or in the brochure of the Company COGNIS (Düsseldorf, Germany) "Empol Dimer and Poly-basic Acids; Technical Bulletin 114C (1997)".

In the production of the copolymer of the elastic fiber the dimerised fatty acid can be used as a monomer or as a pre-cursor oligomer or polymer. In one example the pre-cursor polymer is a polyester, formed of dimerised fatty acid and/or dimerised fatty diol with any combination of diols or dicarboxylic acids. In another example the pre-cursor polymer is a polyamide, formed of dimerised fatty acid and/or dimerised fatty diamines with any combination of diamines or dicarboxylic acids forming polyamides. It is also possible that the pre-cursor polymer is a polyester-amide.

The dicarboxylic acid may be aliphatic or aromatic. Suitable aliphatic dicarboxylic acids include oxalic acid, succinic acid, fumaric acid, suberic acid, sebacic acid and cyclohexane dicarboxylic acid. Suitable aromatic dicarboxylic acids include terephthalic acid, isophthalic acid, orthophthalic acid, naphthalene-dicarboxylic acid and para-phenylene dicarboxylic acid. Preferably at least one aromatic dicarboxylic acid is terephthalic acid or naphthalene dicarboxylic acid. Preferably at least 80 mol. %, more preferably at least 90 mol. %, most preferably at least 98 mol. % of the monomer units of dicarboxylic acids of the further monomer units are one or more aromatic dicarboxylic acids. The balance of the dicarboxylic acids of the further monomer units may contain of aliphatic dicarboxylic acids.

Suitable diols are aliphatic diols, for example ethylene glycol, 1,3-propylene glycol, 1,4-butanediol, 1,6-hexanediol, neopentyl glycol, trimethylene glycol, tetramethylene glycol, cyclohexane dimethanol. An example of a suitable aromatic diol is 2,2-bis (4-hydroxyphenyl)propane. Sugar based diols, like for instance isosorbide, isomannite or isoidide may also be used. Preferably greater than 50, more preferably greater than 70, particularly greater than 90, and especially greater than 95 and up to 100 mole % of the diols are aliphatic glycol (s), preferably ethylene glycol and/or 1,4-butanediol.

In a particularly preferred embodiment of the invention, the further monomer units are 1,4-butanediol and terephthalic acid, ethylene glycol and terephthalic acid, ethylene glycol and naphthalene dicarboxylic acid, 1,4-butanediol and naphthalene dicarboxylic acid or mixtures thereof. Most preferably the further monomer units are 1,4-butanediol and terephthalic acid.

The copolymer of the elastic fiber may further contain units of one or more polyether diols, for example poly(ethylene glycol), poly(propylene glycol), more particular poly-1,3-propylene glycol or poly-1,2-propylene glycol, poly(tetramethylene glycol), poly(hexamethyleneglycol), poly(ethylene glycol-tetramethylene glycol)copolymer, poly(ethylene glycol-propylene glycol)copolymers etc.

Preferably the copolymer consists for at least for 95 wt %, more preferably 98 wt. % of monomeric units of dimerised fatty acid and/or one or more derivatives thereof, 1,4-butanediol and terephthalic acid.

Preferably the copolymer contains between 20 and 70 wt. % of the monomer units of the dimerised fatty acid and/or a derivative thereof, more preferably between 30 and 50 wt. %. This ensures a high melting point of the copolymer and a high flexibility and good low temperature properties.

Examples of the preparation of such copolymers are described in for example Handbook of Thermoplastics, etc. O. Olabishi, Chapter 17, Marcel Dekker Inc., New York 1997, ISBN 0-8247-9797-3, in Thermoplastic Elastomers, 2nd Ed, Chapter 8, Carl Hanser Verlag (1996) ISBN 1-56990-205-4, in Encyclopaedia of Polymer Science and Engineering, Vol. 12, Wiley & Sons, New York (1988), ISBN 0-471-80944, p. 75-117 and the references cited therein.

During or after the production of the copolymer additives may be added. These additives can function as anti-oxidants, UV-absorbers, nucleating agents, dies or pigments, and anti-static agents. Stabilizers that can be used for example are hindered phenol antioxidants such as 1,3,5-trimethyl-2,4,6-tris(3,5,-di-t-butyl-4-hydroxybenzyl)benzene, and 3,9-bis{243-(3-t-butyl-4-hydroxy-5-methylphenyl)-propionyloxyl-1,1-dimethylethyl}-2,4,8,10-tetraoxaspiro[5,5] undecane or stabilizers such as tris(2,4-di-t-butylphenyl) phosphite, trilauryl phosphite, 2-t-butyl-alpha-(3-t-butyl-4-hydroxyphenyl)-p-cumenyl-bis(p-nonylphenyl)phosphite, Examples of the above ultraviolet absorbers include, for example, p-t-butylphenyl salicylate, 2-hydroxy-4-methoxybenzophenone, 2-hydroxy-4-methoxy-2'-carboxybenzophenone, 2,4,5-trihydroxy-butylophenone, and so on. Examples of the above nucleating agents are talcum, carboxylic acid salts like sodium benzoate and sodium stearate, titanium oxide and so on.

The polymer composition comprising the copolymer containing monomeric units of a dimerised fatty acid or a derivative thereof preferably comprises at least 50 wt. % of the copolymer, more preferably at least 75 wt. % of the copolymer, most preferably at least 90 wt. % of the copolymer.

The elastic fiber may be produced by melt spinning of the polymer composition comprising the copolymer containing monomeric units of a dimerised fatty acid or a derivative thereof. The spun fibers may be twisted and twined into yarns. It is also possible to produce textured yarns. Fabrics may be produced by weaving or knitting the yarn of the elastic fibers.

The fabrics may contain 100 wt. % of the elastic fiber, but it is also possible that a fabric contains the elastic fiber and one or more further fibers, in all kind of weight ratio. Examples of further fibers include PET fibers, nylon fibers, cotton fibers etc. It is for example possible that the fabric contains 95 wt. % of PET fibers and 5 wt. % of the elastic fibers.

Examples of clothing with a medical function include garments for lymphatic and venous disorders.

It is also possible to coat the elastic fibers with a hydrophilic coating. In that case the moisture is even faster transported away from the skin.

COMPARATIVE EXPERIMENTS A AND B, EXAMPLE I.

Elastic fabrics having a size of 100×100 mm were tested on water uptake according to DIN 53923, version 1978-01.

The tests were performed at 20° C. and 65% relative humidity. The samples were immersed in water of 20° C. for a period of 60 seconds and allowed to drip off for 120 seconds after that. The weight of the fabric before ($W_{bef}$) and after immersion ($W_{af}$) was measured. The water uptake was calculated by:

$$[(W_{af}-W_{bef})/W_{bef}]*100\%.$$

Of each fabric 5 samples were tested and the average value is given. The fabric of comparative experiment A consists of PET/Elastan yarns, the fabric of comparative experiment B consists of PA/Elastan yarns. The fabric of example I consists of yarns of Arnitel™ Eco, a polymer comprising monomeric units of a dimerised fatty, 1,4-butanediol and terephthalic acid. The results are presented in Table 1.

TABLE I

|  | Average water uptake (%) |
| --- | --- |
| Comparative experiment A. | 277.9 |
| Comparative experiment B. | 437.8 |
| Example I. | 155.8 |

The fabric according to the invention clearly shows a much lower water uptake than the fabrics according to the state of the art.

The invention claimed is:

1. Clothing comprised of at least one fabric comprising elastic fibers, wherein the elastic fibers are formed of a polymer composition comprising a copolymer containing 20-80 wt. % of monomeric units of a dimerised fatty acid or a derivative thereof and further monomer units of at least one dicarboxylic acid and at least one diol, wherein
   the clothing is selected from the group consisting of sports clothing, protective clothing, clothing for body shaping and clothing with a medical function.

2. The clothing according to claim 1, wherein the copolymer contains between 20 and 70 wt. % of the monomer units of the dimerised fatty acid and/or a derivative thereof.

3. The clothing according to claim 1, wherein the copolymer contains between 30 and 50 wt. % of the monomer units of the dimerised fatty acid and/or a derivative thereof.

4. The clothing according to claim 1, wherein the at least one dicarboxylic acid is terephthalic acid.

5. The clothing according to claim 1, wherein at least one diol is 1,4-butanediol.

6. The clothing according to claim 1, wherein the copolymer consists of at least 98 wt. % of monomeric units of dimerised fatty acid and/or one or more derivatives thereof, 1,4-butanediol and terephthalic acid.

* * * * *